US012049381B2

(12) United States Patent
Axelsson

(10) Patent No.: US 12,049,381 B2
(45) Date of Patent: Jul. 30, 2024

(54) CONVOLUTE WINDING OF PAPER CORES

(71) Applicant: CFE Nordic AB, Falkenberg (SE)

(72) Inventor: Karl-Henrik Axelsson, Falkenberg (SE)

(73) Assignee: CFE NORDIC AB, Falkenberg (SE)

( * ) Notice: Subject to any disclaimer, the term of this patent is extended or adjusted under 35 U.S.C. 154(b) by 250 days.

(21) Appl. No.: 17/597,302

(22) PCT Filed: Jul. 3, 2020

(86) PCT No.: PCT/EP2020/068853

§ 371 (c)(1),
(2) Date: Dec. 31, 2021

(87) PCT Pub. No.: WO2021/004952

PCT Pub. Date: Jan. 14, 2021

(65) Prior Publication Data

US 2022/0315379 A1 Oct. 6, 2022

(30) Foreign Application Priority Data

Jul. 5, 2019 (EP) .................................... 19184710

(51) Int. Cl.
*B65H 81/06* (2006.01)
*B31C 1/00* (2006.01)
(Continued)

(52) U.S. Cl.
CPC ............... *B65H 81/06* (2013.01); *B31C 1/00* (2013.01); *B65H 75/10* (2013.01); *B65H 75/50* (2013.01); *B65H 2701/5112* (2013.01)

(58) Field of Classification Search
CPC ............................... B65H 81/06; B65H 75/10; B65H 2710/5112; B65H 75/50; B31C 1/00
(Continued)

(56) References Cited

U.S. PATENT DOCUMENTS 3,869,325 A 3/1975 Witzig
3,983,905 A 10/1976 Witzig
(Continued)

FOREIGN PATENT DOCUMENTS

DE 1149235 B 5/1963
EP 3323605 A1 5/2018
GB 1168696 A 10/1969

OTHER PUBLICATIONS

European Search Report in corresponding Application No. EP 19184710 dated Jan. 2, 2020.
(Continued)

*Primary Examiner* — James D Sells
(74) *Attorney, Agent, or Firm* — BUCHANAN, INGERSOLL & ROONEY PC

(57) ABSTRACT

A method for producing a convolute paper core of a desired width and thickness, the method including unwinding paper from a paper roll, thereby creating unwound paper, conveying the unwound paper to a cutting position in a feeding direction, cutting the unwound paper, thereby creating a paper sheet having a length L, conveying the paper sheet from the cutting position to a mandrel in a winding direction, wherein the winding direction is perpendicular to the feeding direction, adhesively and convolutely winding the paper sheet on the mandrel so as to produce a paper core, so that a width W of the paper core is equal to the length L, and repeating the steps of unwinding, conveying, cutting, conveying and adhesively and convolutely winding a plurality of paper sheets until the paper core has the desired thickness.

16 Claims, 3 Drawing Sheets

(51) Int. Cl.
*B65H 75/10* (2006.01)
*B65H 75/50* (2006.01)

(58) Field of Classification Search
USPC .......................................................... 156/184
See application file for complete search history.

(56) References Cited

U.S. PATENT DOCUMENTS

| | | | |
|---|---|---|---|
| 4,095,512 A | 6/1978 | Stark | |
| 2019/0263082 A1* | 8/2019 | Spanjers .................. | B31C 1/00 |

OTHER PUBLICATIONS

International Search Report (PCT/ISA/210) and Written Opinion (PCT/ISA/237) mailed on Sep. 9, 2020, by the European Patent Office as the International Searching Authority for International Application No. PCT/EP2020/068853.

* cited by examiner

CONVOLUTE WINDING OF PAPER CORES

FIELD OF THE INVENTION

The present invention relates to a method for convolutely winding paper sheets into paper cores, more specifically a method for convolutely winding a plurality of paper sheets into one or more paper cores.

BACKGROUND

In the paper industry, paper cores are used to roll, store and transport paper and board. Due to the vast usage of paper and board worldwide, a lot of paper cores are consumed. These paper cores are produced with a wide range of diameters, thicknesses and widths in order to accommodate different types and dimensions of paper intended for different purposes.

Some major problems constituted by the paper cores concern the aspects of manufacturing, storage and the logistics of them. The paper cores are traditionally not produced on site, i.e. are not produced at the paper mill producing the paper or board that is to be rolled upon the paper cores. This entails that the cores have to be transported to the mill, or any other site or industry that may need them, which in and of itself is time consuming, costly and a logistical challenge. Furthermore, the cores, upon arrival to the site, have to be transported to a storage, stored, and subsequently brought to the production line where they are to be used. Finally, the production of paper web and the final winding of the paper onto a core has to be coordinated with the transportation of said core to the production line, creating further costs and potential complications.

Traditionally, paper cores have been wound from board material by two different techniques: spiral winding and convolution winding, also called parallel winding. During spiral winding, a plurality of plies is wound around a cylindrical mandrel. By feeding the plies in an overlapping position at an angle towards the mandrel, a core is continuously wound. The core is then cut off at a certain length, thereby creating a cylindrical core of a certain width. However, the large number of paper plies being fed at an angle when winding the spiral core results in long set up times causing waste and inflexibility when changing core dimensions, a problem especially prominent when producing a small number of cores.

During convolute winding, or parallel winding, the paper web is fed at a right angle to the mandrel, and the paper is wound to a paper core. Such a process has been realized by convolute winders made by Adolf Brodbeck GmbH among others. Here, the width of the manufactured paper core will be the same as the length of the paper web that is wound on said core. The width of the core can also be referred to as the length of the core. If different widths of cores are to be produced, then the length of the paper sheet needs to be adjusted accordingly. However, as the diameter and the thickness of the core depends on the width of the paper sheet, a core of high thickness or diameter demands a very wide paper web. Since there is a practical limit on how wide the paper web can be, there is consequently a limit on how large core diameters and wall thicknesses of paper cores that can be manufactured in present day convolute winders.

Nowadays, spirally wound cores are almost exclusively used in the paper mill industry due to the aforementioned problems with large dimensions of the paper web in convolute winders. However, spirally wound cores are not without their problems. First and foremost, the number of joints make the structure weaker. Furthermore, the production thereof necessitates a plurality of paper lines and a plurality of paper rolls. Drying, storing and logistical costs as well as the transportation of the spiral wound cores from the production unit to the paper mill also pose a disadvantage.

In light of the aforementioned problems both relating to the logistical costs associated with paper cores as well as the physical limitations of the cores produced by present day methods, there is a need for way to easily and efficiently produce strong paper cores on site, JIT (just in time).

SUMMARY OF THE INVENTION

An object of the present invention is therefore to alleviate at least some of the abovementioned problems with the current state of the art.

According to a first aspect of the present invention, a method for producing a convolute paper core of a desired width and thickness is provided, the method comprising: unwinding paper from a paper roll, thereby creating unwound paper; conveying the unwound paper to a cutting position in a feeding direction; cutting the unwound paper, thereby creating a paper sheet having a length L; conveying the paper sheet from the cutting position to a mandrel in a winding direction, wherein the winding direction is perpendicular to the feeding direction; adhesively and convolutely winding the paper sheet on the mandrel so as to produce a paper core, so that a width W of the paper core is equal to the length L; and repeating the steps of unwinding, conveying, cutting, conveying and adhesively and convolutely winding a plurality of paper sheets until the paper core has the desired thickness.

According to a second aspect of the present invention, an apparatus for carrying out the method according to the first aspect of the invention is provided, the apparatus comprising: an unwinding unit for unwinding paper from a paper roll, thereby creating unwound paper; a cutting unit adapted to receive the unwound paper from a feeding direction and to cut the unwound paper, thereby creating a paper sheet having a length L; a mandrel for adhesively and convolutely winding the paper sheet to produce a paper core; wherein the mandrel is adapted to receive the paper sheet from a winding direction, which is perpendicular to the feeding direction.

The present invention is based on the realization that cutting an unwound paper web fed to a cutting position in a first direction and thereafter convey the resulting paper sheets in a second to a mandrel, and by having the first and second directions being perpendicular, a length of the paper sheets that are to be wound to a paper core is easily converted to the width of the core. Furthermore, by placing the paper sheets edge to edge, or splicing a preceding sheet to a subsequent sheet, a web with uniform thickness is produced which results in a paper core with uniform thickness.

Paper is to be understood as referring to any type of cellulose based, cellulose like or cellulose comprising material that is essentially structured as a web of fibres. Instead of paper, plastic or metal based foil or film, or any similar material film-like material could be used. The paper core can be made of any such material, or a combination thereof.

Convolute winding is to be understood as winding the paper sheets into a paper core in a parallel fashion, i.e. that there exists no angular difference between the paper sheets when wound by the mandrel of the winder. Therefore, the paper core that is produced is a layered structure wherein the visible, outer surface of the structure only comprises one joint substantially parallel to a longitudinal axis of the paper core.

The benefit of the aforementioned relationship between directions is that the length L of the paper sheet is the same length as the width W of the paper core produced by the method. In this way, choosing at which length L the unwound paper is to be cut translates into choosing the width W of the paper core. Due to this, paper cores of varying widths are readily produced by the method. This entails that the method offers an easy way of adapting to variable demands of paper core widths.

By convolutely winding a plurality of paper sheets a core of higher strength is produced. Therefore, a paper core produced by the method can carry a higher weight of paper, and thus is more material efficient.

According to an exemplary embodiment, a subsequent paper sheet is conveyed to the mandrel and placed adjacent to or in contact with a preceding paper sheet before the preceding paper sheet is completely wound by the mandrel so as to form a sheet with a uniform thickness comprising both of the individual sheets.

That a subsequent sheet is placed adjacent to, and not in contact with, a preceding sheet while the preceding sheet is being wound means that the subsequent sheet will be wound onto the core with a distance to the preceding sheet.

By placing a paper sheet adjacent to or in contact with one that is currently being wound by the mandrel of the winder, a continuous feed of paper sheets to the winder is established. By not having any overlap between the plurality of paper sheets that are wound to a paper core, the layers of the paper core are uniform in thickness.

According to an exemplary embodiment, the subsequent paper sheet is placed such that it at least partially overlaps the preceding paper sheet.

By at least partially overlapping a subsequent sheet with the preceding sheet, a larger area of adhesion is achieved. The subsequent paper sheet may be placed with an overlap with the preceding sheet such as a respective edge portion of the two sheets overlap.

According to an exemplary embodiment, each paper sheet comprises a leading edge facing the mandrel and a trailing edge opposite the leading edge, and further comprising the step of grinding the leading edge and the trailing edge of each paper sheet, such that a grinded profile of the leading edge of the paper sheet is complementary to a grinded profile of the trailing edge of the paper sheet.

A grinded profile is to be understood as a cross-section of the edge as viewed from the side, i.e. as viewed in a direction perpendicular to a direction in which the edge is facing. A grinded profile may be slanted. A grinded profile may be nonslanted, i.e. perpendicular in relation to the direction in which the edge is facing. A grinded profile may be saw tooth-shaped, wedge-shaped or grinded to any other geometrical shape.

That the grinded edges are complementary to each other means that they can be fitted together so that the paper sheets to which the edges belong form a flat, smoothly joined continuous paper web.

By having grinded edges with slanted profiles that are complementary to each other, and placing such edges in contact with each other, a high surface contact between two sheets is achieved. Moreover, the grinded edges may be coated with an adhesive. A high surface contact entails a high area of adhesion, making the sheets adhere more strongly to each other and thereby more easily winding them together.

By winding a plurality of paper sheets smoothly joined together by complementary edges into a paper core, the layers of the core have uniform thicknesses, thus making the resulting core radially uniform in thickness.

According to an exemplary embodiment, each paper sheet comprises a leading edge facing the mandrel and a trailing edge opposite the leading edge, and further comprising the step of grinding the leading edge and the trailing edge of each paper sheet, such that a grinded profile of the leading edge of the paper sheet is mirror symmetrical to a grinded profile of the trailing edge of the paper sheet.

That a grinded profile is mirror symmetrical to another grinded profile is to be understood as the profiles being symmetrical with regards to a plane of symmetry between the grinded profiles. That they are mirror symmetrical means that they are not complementary. As such, arranging two edges that have mirror symmetrically grinded profiles next to each other entails that they will not immediately fit to one another.

According to an exemplary embodiment, a trailing edge of a preceding sheet is placed in adhesive contact with a leading edge of a subsequent sheet so that the grinded profile of the trailing edge of the preceding sheet is press-fitted to the grinded profile of the leading edge the subsequent sheet when the paper core is adhesively and convolutely wound so as to form a uniform sheet.

A uniform sheet is formed by press-fitting the grinded profiles of the edges of the two sheets together such that they adhere to each other. The press-fitting of the grinded profiles may e.g. be carried out after they have been arranged in an overlapping manner.

According to an exemplary embodiment, a method is provided, further comprising the step of applying adhesive to the paper sheet.

Adhesive is e.g. applied to a surface of the paper sheet facing radially inwards. By applying adhesive on a surface facing radially inwards of a paper sheet, the sheet is easily adhered to a paper core. By winding the paper sheet with the adhesive top surface facing radially inwards in relation to the paper core, the paper sheet is in maximum contact with the core and therefore the adhesion thereto is also maximized.

According to an exemplary embodiment, the paper sheet 8 further comprises a film, wherein the method further comprises the step of heating or applying pressure to the film so that it is made adhesive.

The film may e.g. be a plastic film. By having a plastic film coating a paper sheet, the adhesive properties of the paper is controllable. A plastic film can coat any surface of the paper sheet. By applying heat, the properties of the plastic film are altered. Due to this, the plastic film can be heated to an extent of choice, by which the adhesive properties of the sheet can be controlled. The plastic film may, e.g., only be heated at certain spots or in a certain geometrical pattern, only making the areas that have been subjected to the heating adhesive. The step of heating can be applied between any other steps, or within any other step, of the method. The heating can e.g. be applied when the paper sheet has been cut from the unwound paper and before it is conveyed to the winder. The heating can e.g. be applied while the paper core is being wound.

The film may alternatively be an adhesive, such as a glue, adapted to achieve adhesive properties first after having been heated, subjected to pressure, ultraviolet light or any other radiation that might cause the adhesive to react. The paper may be preglued, i.e. glued before being unwound into the apparatus. The pressure is e.g. applied by any conveyor in the process or by the winding of the paper.

According to an exemplary embodiment, a part of a first paper sheet of the plurality of sheets is made adhesive.

In order for the paper core to be able to be detached from the mandrel, the inside cannot be too adhesive. Therefore, the first paper sheet is only made partially adhesive. By only having a part of the first paper sheet adhesive, it does not get stuck to the mandrel, and the part that is adhesive is easily attached to a subsequent sheet and the next layer in the core. Preferably, the trailing edge of the first sheet is made adhesive so that it is easily adhered to a leading edge of a preceding sheet. Furthermore, a strip on a surface facing radially inwards of a first sheet of a plurality of sheets may also be made adhesive so that the first sheet is at least partially adhered to the mandrel.

According to an exemplary embodiment, a method is provided, further comprising the step of adjusting the length L at which the unwound paper is cut so that a paper core of a desired width W can be produced.

The step of adjusting the length can be applied between any steps, or within any step, of the method before the step of cutting of the unwound paper. The information about the choice of length may be fed directly into a device performing the step of cutting the unwound paper, a terminal attached thereto or by a wireless means. A device performing the step of cutting may be set to cut after the passing of a specific time interval, or at specific markers on the unwound paper or by some other means of measuring the length of the paper.

By having the length L of the paper sheets be the same length as the width W of the paper core, an easy and efficient way of producing a paper core of desired width is achieved. The paper core may also be cut into multiple cores with widths W1, W2, . . . , Wn where the sum of the widths of the smaller cores equals W. The width W of the paper core may also be referred to as a length of the paper core.

According to an exemplary embodiment, an apparatus is provided, further comprising an adhesion application unit for applying adhesive to the paper sheet or a heating unit for heating a plastic film on the paper sheet.

The heating application unit may be placed between any other units, or incorporated into or joined with any other unit. The adhesive may for example be applied by rollers, by brushes, by spraying or by having the paper sheet pass by a surface coated in the adhesive.

BRIEF DESCRIPTION OF THE DRAWINGS

For exemplifying purposes, the invention will be described in closer detail in the following with reference to exemplary embodiments thereof illustrated in the attached drawings, wherein.

DETAILED DESCRIPTION

In the following detailed description, some embodiments of the present invention will be described. It is however to be understood that, unless anything else is specifically indicated, features of the different embodiments are exchangeable between the embodiments and may be combined in different ways. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

The invention will now by way of example be described in more detail by means of embodiments and with reference to the accompanying drawings.

Figure 1:
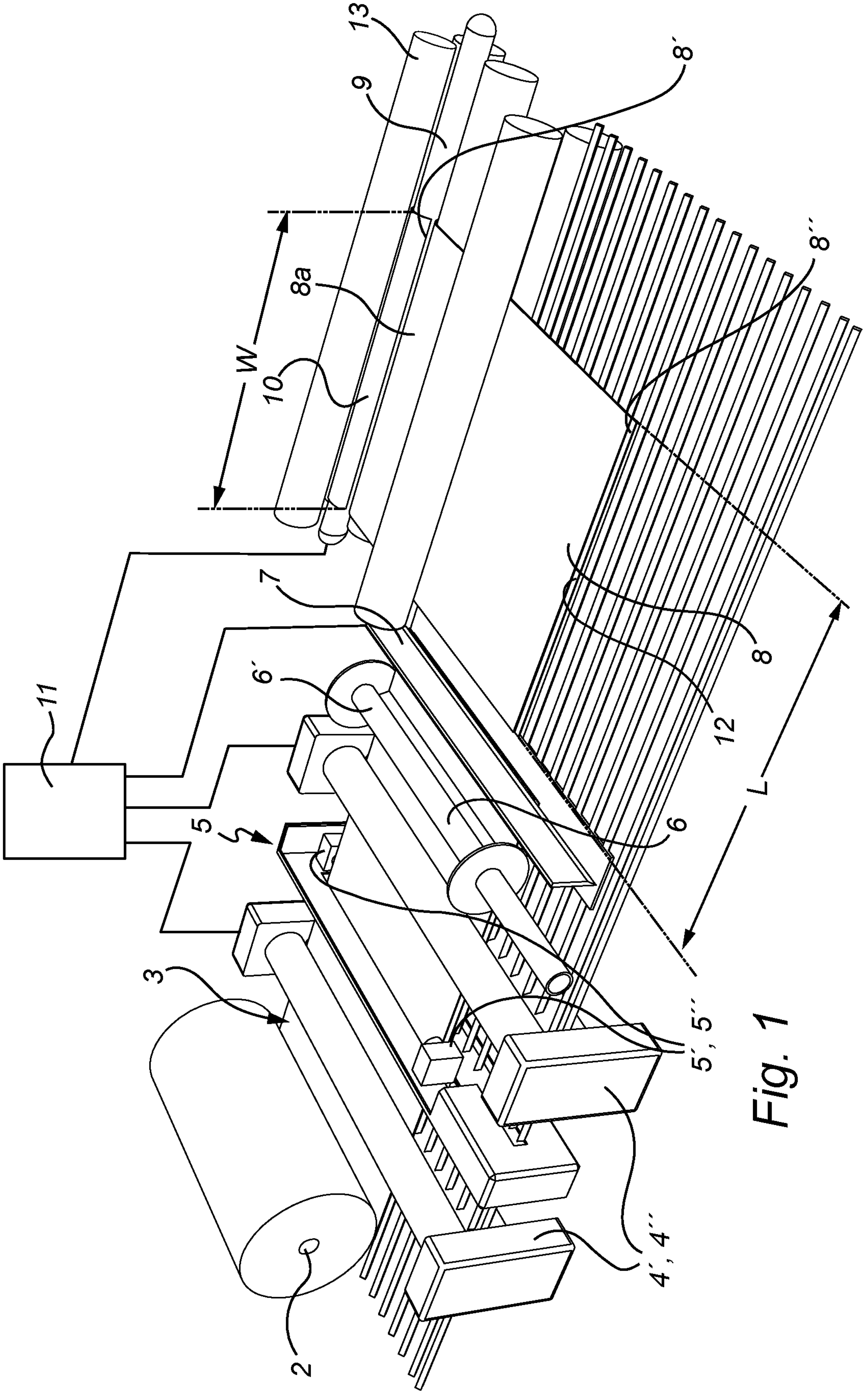
FIG. 1 is a schematic perspective view of a first exemplary embodiment of the present invention.

FIG. 1 discloses an apparatus 1 for carrying out the method of producing a paper core by adhesively and convolutely winding a plurality of paper sheets. Paper is unwound by an unwinder 2 and fed to a conveyor 4' of the apparatus. The unwound paper 3 is then brought to a grinder 5. The grinder 5 comprises a first and a second grinding means 5,5" arranged grind the edges of the unwound paper 3 into a grinded profile 12. The grinding means 5,5" are situated on opposite sides of the paper sheet as seen in a vertical direction, thereby grinding the edges of the unwound paper 3 so that they are complementary to each other. The edges may be grinded into specific shapes as seen in a cross-section in the direction in which the unwound paper is conveyed. The edges may e.g. be grinded into wedge-shapes. The grinding of the edges into grinded profiles increase the area of the edges, and consequently the area of adhesion between two edges of the separate sheets having been produced by cutting of unwound paper 3.

Alternatively, the first and second grinding means 5',5" may be arranged on the same side of the paper sheet as seen in a vertical direction, thereby grinding the edges of the unwound paper 3 so that they are not complementary to each other. The edges may e.g. be grinded such that they have a mirror symmetry with respect to each other.

The unwound paper 3, after having been grinded, is conveyed by a conveyor 4" to an adhesive applicator 6, where it is subjected to application of adhesive. The adhesive may also be applied before grinding. Preferably, the adhesive is applied after grinding such that the grinded edges are coated with adhesive as well. In the illustrated case, adhesive is applied on the top surface of the paper. This surface will then be facing radially inwards when it is wound on a mandrel 9 to form a core 10, as will be discussed below. In order to avoid adhesion to the mandrel 9, it may be advantageous to apply adhesive only on a portion of the first sheet of a core, and leave a portion **8*a* without adhesive. Leaving a part 8*a* of the first paper sheet without adhesive can be done by having a part 6' of the adhesive applicator 6 be turned off when the unwound paper 3 that is to be the first sheet passes the adhesive applicator 6**, thereby only depositing adhesive on a part of the paper.

Figure 2:
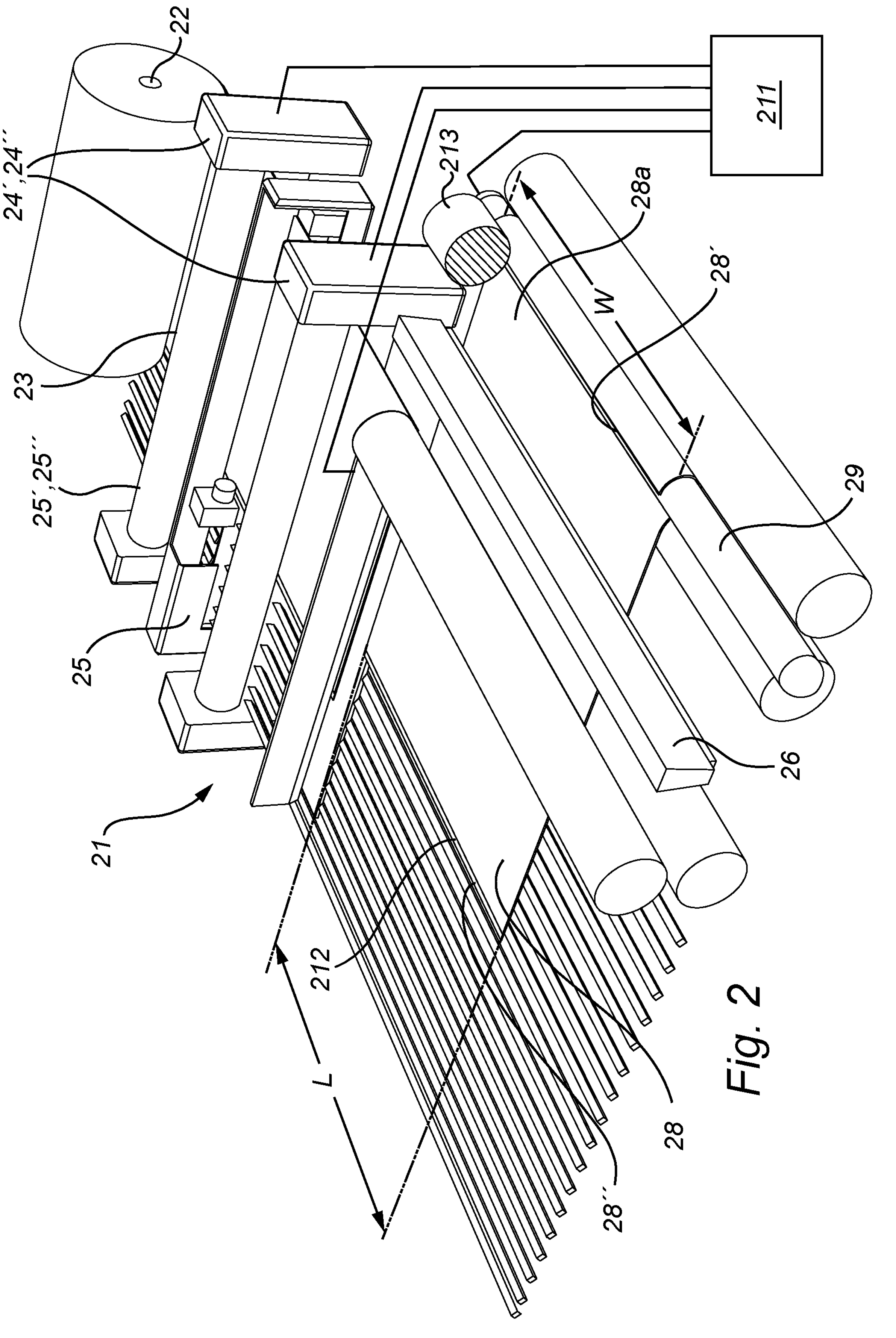
FIG. 2 is a schematic perspective view of a second exemplary embodiment of the present invention.

FIG. 2 shows unwound paper 23 that has been pre-coated with a film adapted to be melted by heat, whereupon it is turned adhesive. In such a process, the step of applying the adhesive may not be needed. Alternatively, adhesive is only applied to the grinded edges. As is seen in FIG. 2, there is no adhesive applicator 6. A heater 26, configured to heat the plastic film in order to render it adhesive, is here placed towards the end of the process, just before the mandrel 29. The step of heating the plastic film may therefore be applied after the unwound paper has been cut and before the resulting paper sheet is wound in the winder. The heating is preferably done by IR-radiation. The heating can also be done by convective heating, or by radiative heating of other wavelengths. Furthermore, the paper, and subsequently the paper sheet 8, may be pre-coated with a film or a glue that is adapted to become adhesive when subjected to pressure. A pressure unit (not shown) may be incorporated into the apparatus adapted to apply pressure to the film or glue in order to make the paper sheet adhesive.

For reasons discussed above, it may be advantageous to avoid making the first section of the first paper sheet of a core 10 adhesive. In the embodiment in FIG. 2, this may be easily achieved by not activating the heater 26 until the first section 28*a* has passed onto the mandrel 29. The heater 26 is then activated, and heats the plastic film of the remained of the first paper sheet and all following sheets. Alternatively, the heater 26 may be reoriented so as to be directed towards the mandrel. In such a constellation, the heater may heat the part of the paper sheet that is already wound upon the mandrel 9, such as the part that has passed the top most roller of the three rollers 13 of the winder. Moreover, in the case where the paper sheet is pre-coated with a glue or a film adapted to become adhesive after being subjected to pressure, the pressure unit may apply pressure at specific parts of a first paper sheet in order make it selectively adhesive, e.g. only applying pressure on a section 8*a* of a first sheet.

Returning to FIG. 1, the unwound paper 3 is after application adhesive conveyed to a cutting position in a feeding direction. This direction may not coincide with the direction in which the paper is unwound. The paper may be unwound in a first direction and subsequently turned so that it is fed to the cutting position in the feeding direction. The unwound paper 3 is preferably conveyed to a cutting position as a continuous material, but may also be conveyed as discrete units. The length L of the paper sheet is to be understood as a length measuring along the feeding direction. In other words, the unwound paper is fed to the cutting position in a cutting direction and cut off when a certain measure of unwound paper 3 has passed into the cutting position. The unwound paper 3 is cut substantially parallel with and opposite to an edge of the unwound paper 3 opposite that passed into the cutting position prior to the part that subsequently is cut.

The unwound paper 3 is at the cutting position cut into paper sheets 8 by a cutting unit 7. A cutting unit is to be understood as any apparatus that can carry out the operation of cutting the paper. The cutting unit 7 may comprise a blade, a saw, scissors or the like. The length at which the cutting unit cuts the unwound paper 3, thereby creating a paper sheet of length L, may be determined prior to cutting. The length may also be adjusted during use, thereby cutting the paper at a new length L' such that a paper core of a new width W' can be wound.

The paper sheet 8 as produced by the cutting has a leading edge 8' that faces the winder, and a trailing edge 8" opposite the leading edge 8'. The paper sheet 8 is thereafter conveyed further to the winder, where it is wound into a paper core 10 on a mandrel 9. The winder comprises a mandrel 9, upon which the paper is wound into a core, and three rollers 13 for supporting the mandrel 9. The direction in which they are conveyed from the cutting position to the mandrel 9 is perpendicular to the feeding direction in which the unwound paper 3 is fed to the cutting position. The core produced by the method could be a paper core, but it could also be a plastic core, or any core made from any other film material.

The process is repeated until a paper core 10 of desired thickness is produced, i.e. paper sheets are produced by cutting of unwound, brought to the winder where they are wound after one another into a layered paper core. The paper core 10 may be wound by completely winding a preceding sheet, whereupon a subsequent sheet is completely wound, continuing in this manner until the desired thickness is reached. Alternatively, and preferably, the paper core is wound by having first sheet being partially wound whereupon a subsequent sheet 8 is placed adjacent to or in contact with the first sheet. The trailing edge 8" of the first sheet is placed adjacent to or in contact with the leading edge 8' of the subsequent sheet 8. This may be realized either by having the preceding, first, sheet and the subsequent sheet be placed adjacent to or in contact with each other during continuous winding, or by stopping the winding when the sheets are placed adjacent to or in contact with each other after which the winding is resumed until the subsequent sheet is partially wound. That a subsequent sheet is placed adjacent to, and not in contact with, a preceding sheet while the preceding sheet is being wound means that the subsequent sheet will be wound onto the core with a distance to the preceding sheet. The purpose of having a distance between the sheets is to avoid overlap between them, since an overlap would lead to a deviation in the thickness of the core 10 during winding, which deviation would propagate radially throughout the core and create an uneven surface. Furthermore, too uneven of a distribution of mass in the core when it is being wound may lead to instability. This instability may result in vibrations or unwanted oscillations in the system that may run the risk of damaging the equipment. The distance may also be non-present, i.e. the sheets are placed in contact with each other. That the sheets are placed in contact with each other means that they are placed next to each other in such a way as to form a uniform sheet comprising both of the individual sheets. In this way, the sheets are wound into a paper core 10 having smooth edges and a uniform width as determined by the length L of the paper sheets. Here, having grinded edges that are complementary to each other increases the area of contact, and thereby area of adhesion if adhesive have been applied to the edges, between the sheets.

Alternatively, the edges may be grinded such that they are not complementary to each other, but rather have a mirror symmetry with respect to each other. In this case, when two sheets are placed in contact with each other, a trailing edge of a preceding sheet is adhered to a leading edge of a subsequent sheet by means of pressing the grinded profiles together. The pressing may e.g. be done in a horizontal direction, i.e. a direction which coincides with a plane of extension for the preceding sheet and the subsequent sheet. The pressing may preferably be done vertically to a plane of extension for the preceding sheet and the subsequent sheet. For example, the preceding sheet and the subsequent sheet may be pressed together such that the grinded profile of one of the sheets is vertically pressed against the grinded profile of the other sheet. As such, the trailing edge of a preceding sheet may e.g. be placed in adhesive contact with a leading edge of a subsequent sheet so that the grinded profile of the trailing edge of the preceding sheet is press-fitted to the grinded profile of the leading edge of the subsequent sheet when the paper core is adhesively and convolutely wound.

The mandrel 9 may be substantially cylindrical in shape. Therefore, the paper core 10 that is wound around the mandrel 9 is substantially cylindrical. The mandrel 9 has a longitudinal axis defining a cylindrical geometry. The unwinder 2 may e.g. also be substantially cylindrical in shape. As an example, the unwinder 2 and the mandrel 9 is substantially similar in shape and geometry. A longitudinal axis of the unwinder 2 can be perpendicular to a longitudinal axis of the mandrel 9. A longitudinal axis of the unwinder 2 can also have an arbitrary orientation to a longitudinal axis of the mandrel 9, i.e. a deviation in all three dimensions. Furthermore, the mandrel 9 is preferably arranged in such a way so that a longitudinal axis of the mandrel 9 is substantially parallel to a leading edge 8' of a paper sheet 8 that is conveyed to the mandrel 9. In this way, a length L of the paper sheet 8, being the same as a length L of a leading edge 8', is easily converted into a width W of a paper core 10 by winding the paper sheet 8 around the mandrel 9 into the paper core 10.

Adhesively and convolutely winding a plurality of paper sheets into a paper core 10 entails that a layered structure is produced in which the layers are adhered to one another such that a coherent paper core is produced. The paper core 10 is preferably cylindrical in shape. The paper core has a longitudinal axis that may be a cylindrical longitudinal axis. The paper core 10 is therefore preferably a hollow cylinder wherein the hollow portion has substantially the same geometry as the mandrel 9. The thickness of the paper core 10 is to be understood as a radial thickness starting from the circumference of the hollow portion radially extending to the outer circumference of the paper core.

A control unit 11 is connected to the conveyors 4',4", the cutting unit 7 and the winder comprising the mandrel 9. By controlling how far the unwound paper 3 is to be conveyed before the cutting unit 7 cuts it, the length L of the paper sheet 8, and thereby the width of the resulting paper core 10, is readily chosen. The control unit may e.g. be a computer.

Figure 3:
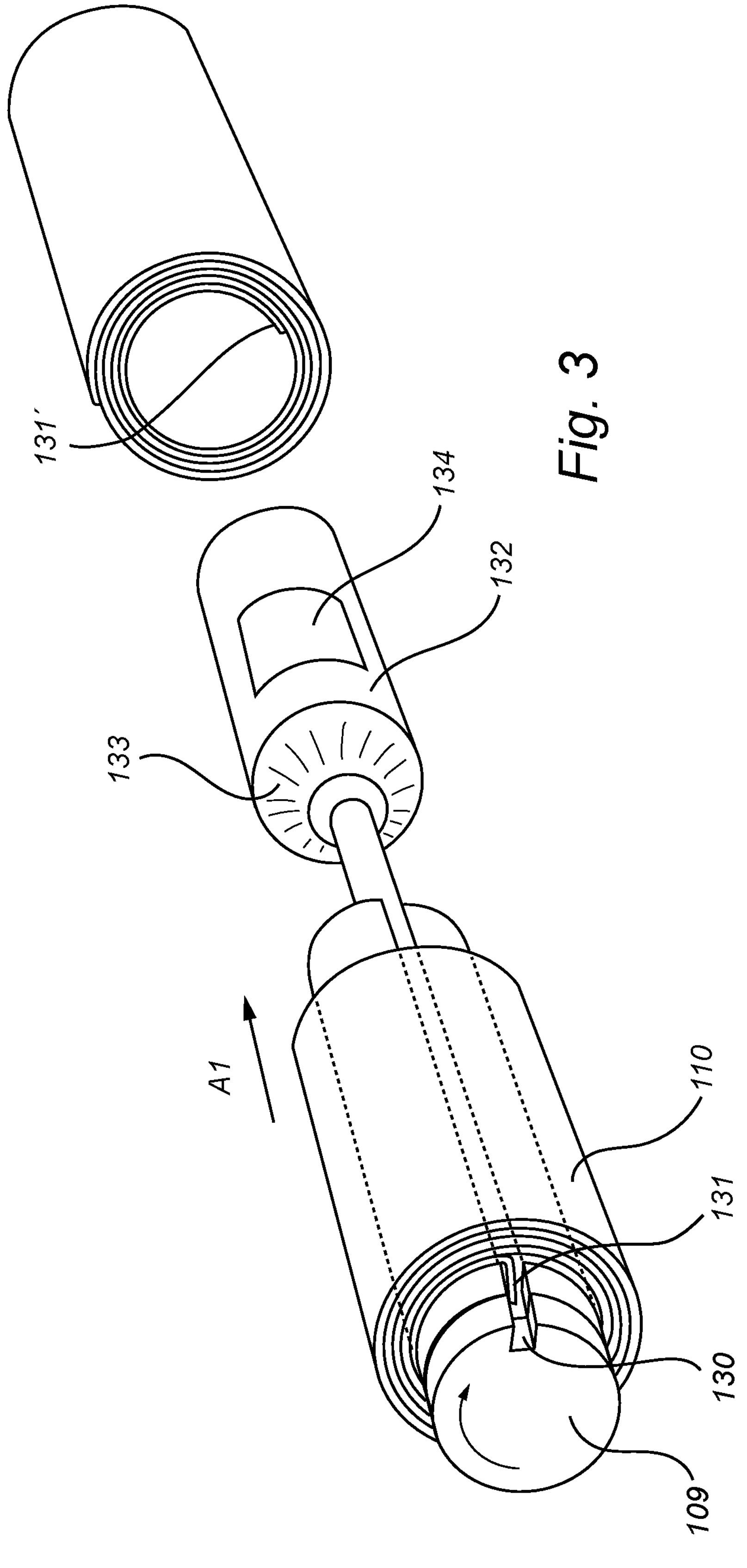
FIG. 3 is a schematic perspective view of an apparatus which allows for the adhesion of a lip of a paper core, which the lip has a substantially radially inwards pointing direction, to an inner surface of the paper core.

FIG. 3 shows a further inventive concept not limited to the inventive concept as described by the first and second aspects. Here, a paper core 110 that has been wound on a mandrel 109 is shown. The mandrel 109 further comprises a slit 130. The slit 130 is adapted to receive a lip 131 of the first sheet of paper being comprised in the core 110. The lip 131 is thus arranged within the slit 130 before the core 110 is wound. By arranging the lip 131 in the slit 130, the paper is more easily wound to a core 110 around the mandrel 109. When the core 110 is wound to the desired thickness, it is transferred off the mandrel 109 in a direction as indicated by the arrow A1. However, when the core 110 has been transferred off the mandrel 109, the lip 131 will still be oriented in a substantially radially inwards direction, and not be smooth with an inner surface of the core 110. In order to get the lip smooth with an inner surface of the core 110, i.e. to fold it radially outwards such that it is flush with the rest of the core 110, the core 110 may be transferred onto a conical element 132 comprising a tapered surface 133. The conical element 132 is adapted to receive the core 110 such that the core slides over the tapered surface 133. By sliding the core 110 over the tapered surface 133, the lip 131 is mechanically pushed radially outwards such that it is flush with the rest of the core 110. Furthermore, it may after having been pushed radially outwards and made flush with the core be adhered to the core.

When an adhesive has already been used prior in the process, there may be adhesive left on the lip 131. This may e.g. be the case when a slow dry glue has been used. In such a case, the lip 131 is already adhesive, and thus will adhere to the core 110 when it has been made flush with the core 110.

When the paper comprised in the paper core 110 comprises a film which can be made adhesive either by pressure or heat, the lip, which also comprise such a film, may be made adhesive by a heating element 134 of the conical element 132. The heat element 134 is thus arranged at a position on the conical element 132 such that is will overlap with the lip 131 of the core 110, when the core 110 is arranged on the conical element 132. By heating the lip 131, the film comprised in the lip will be made adhesive, and as such, the lip 131 will be adhered to the core 110. Thus, when the core 110 has passed the conical element 132, i.e. when it is no longer arranged thereon, the core 110 comprises an adhered lip 131' substantially flush with the rest of the core 110, as seen in FIG. 3.

Alternatively, if the paper of the paper core 110 does not comprise a film which can be made adhesive, adhesive may be applied to the lip 131 before it is arranged on the conical element 132. Alternatively, adhesive may be applied while it is being arranged on the conical element 132, or after it has been arranged on the conical element 132. The adhesive may e.g. be applied by one or more nozzles comprised in the conical element 132.

The process of adhering a lip to an inner surface of a paper core may be described by the following method.

A method for producing a paper core comprising an adhered lip, comprising:

- providing a paper core 110 comprising an inner surface facing radially inwards and a lip 131 having a radially inwards direction;
- providing a conical element 132 comprising a tapered surface 133, said tapered surface 133 substantially facing radially outwards;
- arranging the paper core 110 on the conical element 132 such that the tapered surface 133 faces the inner surface of the paper core 110;
- folding the lip 131 in a radially outwards direction;
- adhering the lip 131 to the inner surface of the paper core 110 such that the lip 131 is an adhered lip 131'.

Two exemplary embodiments of the aforementioned method for producing a paper core comprising an adhered lip may be formulated as follows:

The method for producing a paper core comprising an adhered lip, wherein the lip comprises a film adapted to be made adhesive by heat, wherein the conical element comprises a heating element 134, wherein the step of adhering the lip 131 comprises heating the lip 131 with the heating element 134 such that the film is made adhesive.

The method for producing a paper core comprising an adhered lip, wherein the step of adhering the lip 131 comprises applying an adhesive to the lip 131.

The invention claimed is:

1. A method for producing a convolute paper core of a desired width and thickness, comprising:

- unwinding paper from a paper roll, thereby creating unwound paper;
- conveying said unwound paper to a cutting position in a feeding direction;
- cutting said unwound paper, thereby creating a paper sheet having a length L;
- conveying said paper sheet from said cutting position to a mandrel in a winding direction, wherein said winding direction is perpendicular to said feeding direction;
- adhesively and convolutely winding said paper sheet on said mandrel so as to produce a paper core, so that a width W of said paper core is equal to said length L; and
- repeating the steps of unwinding, conveying, cutting, conveying and adhesively and convolutely winding a plurality of paper sheets until said paper core has the desired thickness;
- wherein a subsequent paper sheet is conveyed to said mandrel and placed adjacent to or in contact with a preceding paper sheet before said preceding paper sheet is completely wound by said mandrel so as to form a sheet with a uniform thickness comprising both of the individual sheets.

2. The method according to claim 1, wherein said subsequent paper sheet is placed such that it at least partially overlaps said preceding paper sheet.

3. The method according to claim 1, wherein each paper sheet comprises a leading edge facing the mandrel and a trailing edge opposite the leading edge, and further comprising the step of grinding said leading edge and said trailing edge of each paper sheet, such that a grinded profile of said leading edge of said paper sheet is complementary to a grinded profile of said trailing edge of said paper sheet.

4. The method according to claim 1, wherein each paper sheet comprises a leading edge facing the mandrel and a trailing edge opposite the leading edge, and further comprising the step of grinding said leading edge and said trailing edge of each paper sheet, such that a grinded profile of said leading edge of said paper sheet is mirror symmetrical to a grinded profile of said trailing edge of said paper sheet.

5. The method according to claim 3, wherein said grinded profile of said leading edge and said grinded profile of said trailing edge are wedge-shaped.

6. The method according to claim 3, wherein a trailing edge of a preceding sheet is placed in adhesive contact with a leading edge of a subsequent sheet so that said grinded profile of said trailing edge of said preceding sheet is fitted to said grinded profile of said leading edge of said subsequent sheet when said paper core is adhesively and convolutely wound.

7. The method according to claim 4, wherein a trailing edge of a preceding sheet is placed in adhesive contact with a leading edge of a subsequent sheet so that said grinded profile of said trailing edge of said preceding sheet is fitted to said grinded profile of said leading edge of said subsequent sheet when said paper core is adhesively and convolutely wound.

8. The method according to claim 7, wherein a trailing edge of a preceding sheet is placed in adhesive contact with a leading edge of a subsequent sheet so that said grinded profile of said trailing edge of said preceding sheet is press-fitted to said grinded profile of said leading edge of said subsequent sheet when said paper core is adhesively and convolutely wound so as to form a uniform sheet.

9. The method according to claim 1, further comprising the step of applying adhesive to said paper sheet.

10. The method according to claim 1, wherein said paper sheet further comprises a film, and wherein said method further comprises the step of heating or applying pressure to said film so that it is made adhesive.

11. The method according to claim 9, wherein a part of a first paper sheet of said plurality of sheets is made adhesive.

12. The method according to claim 1, further comprising the step of adjusting the length L at which said unwound paper is cut so that a paper core of a desired width W can be produced.

13. An apparatus for carrying out the method according to claim 1, said apparatus comprising:

an unwinding unit for unwinding paper from a paper roll, thereby creating unwound paper;

a cutting unit adapted to receive said unwound paper from a feeding direction and to cut said unwound paper, thereby creating a paper sheet having a length L;

a mandrel for adhesively and convolutely winding said paper sheet to produce a paper core;

a conveyor for conveying said paper sheet to said mandrel and placed adjacent to or in contact with a preceding paper sheet before said preceding paper sheet is completely wound by said mandrel so as to form a sheet with a uniform thickness comprising both of the individual sheets;

wherein said mandrel is adapted to receive said paper sheet from a winding direction, which is perpendicular to said feeding direction.

14. The apparatus according to claim 13, further comprising a grinding unit for grinding a leading edge of said paper sheet facing the mandrel and grinding a trailing edge of said paper sheet opposite the leading edge.

15. The apparatus according to claim 12, further comprising an adhesion application unit for applying adhesive to said paper sheet or a heating unit for heating a film on said paper sheet.

16. The apparatus according to claim 12, further comprising a pressing unit for applying pressure to a film on said paper.

* * * * *